(12) United States Patent
McCusker et al.

(10) Patent No.: US 9,354,633 B1
(45) Date of Patent: May 31, 2016

(54) SYSTEM AND METHOD FOR GROUND NAVIGATION

(75) Inventors: Patrick D. McCusker, Walker, IA (US); Bertrand Chaigneau, Plaisance du Touch (FR); Eric Itcia, Blagnac (FR)

(73) Assignee: Rockwell Collins, Inc., Cedar Rapids, IA (US)

(*) Notice: Subject to any disclaimer, the term of this patent is extended or adjusted under 35 U.S.C. 154(b) by 2182 days.

(21) Appl. No.: 12/263,282

(22) Filed: Oct. 31, 2008

(51) Int. Cl.
*G01C 21/00* (2006.01)
*G06G 7/78* (2006.01)
*G05D 1/00* (2006.01)
*G01S 13/95* (2006.01)
*G01S 13/88* (2006.01)
*G01S 3/04* (2006.01)

(52) U.S. Cl.
CPC .............. *G05D 1/0022* (2013.01); *G01S 3/043* (2013.01); *G01S 13/88* (2013.01); *G01S 13/953* (2013.01)

(58) Field of Classification Search
CPC ....... G01S 13/953; G01S 13/88; G01S 3/043; G05D 1/0022
USPC .......................................................... 701/200
See application file for complete search history.

(56) References Cited

U.S. PATENT DOCUMENTS

| 2,416,155 A | 2/1947 | Chubb |
| 2,849,184 A | 8/1958 | Arden et al. |
| 2,929,059 A | 3/1960 | Parker |
| 2,930,035 A | 3/1960 | Altekruse |
| 2,948,892 A | 8/1960 | White |
| 2,965,894 A | 12/1960 | Sweeney |
| 2,994,966 A | 8/1961 | Senitsky et al. |
| 3,031,660 A | 4/1962 | Young |
| 3,049,702 A | 8/1962 | Schreitmueller |
| 3,064,252 A | 11/1962 | Varela |
| 3,070,795 A | 12/1962 | Chambers |
| 3,071,766 A | 1/1963 | Fenn |
| 3,072,903 A | 1/1963 | Meyer |
| 3,107,351 A | 10/1963 | Milam |
| 3,113,310 A | 12/1963 | Standing |
| 3,129,425 A | 4/1964 | Sanner |
| 3,153,234 A | 10/1964 | Begeman et al. |
| 3,175,215 A | 3/1965 | Blasberg et al. |

(Continued)

FOREIGN PATENT DOCUMENTS

| DE | 196 49 838 | 4/1998 |
| GB | 0 814 744 A | 6/1959 |

OTHER PUBLICATIONS

U.S. Appl. No. 11/851,323, filed Sep. 6, 2007, McCusker.

(Continued)

*Primary Examiner* — Victoria P Shumate
*Assistant Examiner* — Reginald R Reyes
(74) *Attorney, Agent, or Firm* — Donna P. Suchy; Daniel M. Barbieri (57) ABSTRACT

A method for determining a heading, velocity, and/or position of an aircraft includes receiving a first radar return at a radar antenna for mounting to a first wing of the aircraft and receiving a second radar return at a radar antenna mounted to a second wing of the aircraft where the first wing and the second wing extend from opposite sides of the aircraft. The method also includes determining a velocity of each wing based on the radar returns using processing electronics and calculating the heading, velocity, and/or position of the aircraft based on the determined wing velocities using the processing electronics.

20 Claims, 8 Drawing Sheets

(56) References Cited

U.S. PATENT DOCUMENTS

| | | | |
|---|---|---|---|
| 3,212,088 | A | 10/1965 | Alexander et al. |
| 3,221,328 | A | 11/1965 | Walter |
| 3,241,141 | A | 3/1966 | Wall |
| 3,274,593 | A | 9/1966 | Varela et al. |
| 3,325,807 | A | 6/1967 | Burns et al. |
| 3,334,344 | A | 8/1967 | Colby, Jr. |
| 3,339,199 | A | 8/1967 | Pichafroy |
| 3,373,423 | A | 3/1968 | Levy |
| 3,397,397 | A | 8/1968 | Barney |
| 3,448,450 | A | 6/1969 | Alfandari et al. |
| 3,618,090 | A | 11/1971 | Garrison |
| 3,680,094 | A | 7/1972 | Bayle et al. |
| 3,716,855 | A | 2/1973 | Asam |
| 3,739,380 | A | 6/1973 | Burdic et al. |
| 3,781,878 | A | 12/1973 | Kirkpatrick |
| 3,810,175 | A | 5/1974 | Bell |
| 3,815,132 | A | 6/1974 | Case et al. |
| 3,866,222 | A | 2/1975 | Young |
| 3,885,237 | A | 5/1975 | Kirkpatrick |
| 3,956,749 | A | 5/1976 | Magorian |
| 4,024,537 | A | 5/1977 | Hart |
| 4,058,701 | A | 11/1977 | Gruber et al. |
| 4,058,710 | A | 11/1977 | Altmann |
| 4,063,218 | A | 12/1977 | Basov et al. |
| 4,277,845 | A | 7/1981 | Smith et al. |
| 4,405,986 | A | 9/1983 | Gray |
| 4,435,707 | A | 3/1984 | Clark |
| 4,481,519 | A | 11/1984 | Margerum |
| 4,532,515 | A | 7/1985 | Cantrell et al. |
| 4,594,676 | A | 6/1986 | Breiholz et al. |
| 4,595,925 | A | 6/1986 | Hansen |
| 4,598,292 | A | 7/1986 | Devino |
| 4,628,318 | A | 12/1986 | Alitz |
| 4,646,244 | A | 2/1987 | Bateman et al. |
| 4,649,388 | A | 3/1987 | Atlas |
| 4,654,665 | A | 3/1987 | Kiuchi et al. |
| 4,685,149 | A | 8/1987 | Smith et al. |
| 4,760,396 | A | 7/1988 | Barney et al. |
| 4,828,382 | A | 5/1989 | Vermilion |
| 4,843,398 | A | 6/1989 | Houston et al. |
| 4,912,477 | A * | 3/1990 | Lory .................. H01Q 1/287 342/372 |
| 4,914,436 | A | 4/1990 | Bateman et al. |
| 4,924,401 | A | 5/1990 | Bice et al. |
| 4,939,513 | A | 7/1990 | Paterson et al. |
| 4,951,059 | A | 8/1990 | Taylor, Jr. |
| 4,953,972 | A | 9/1990 | Zuk |
| 4,965,573 | A | 10/1990 | Gallagher et al. |
| 4,987,419 | A | 1/1991 | Salkeld |
| 5,045,855 | A | 9/1991 | Moreira |
| 5,047,779 | A | 9/1991 | Hager |
| 5,047,781 | A | 9/1991 | Bleakney |
| 5,049,886 | A | 9/1991 | Seitz et al. |
| 5,166,688 | A | 11/1992 | Moreira |
| 5,173,703 | A | 12/1992 | Mangiapane et al. |
| 5,175,554 | A | 12/1992 | Mangiapane et al. |
| 5,198,819 | A | 3/1993 | Susnjara |
| 5,202,690 | A | 4/1993 | Frederick |
| 5,247,303 | A | 9/1993 | Cornelius et al. |
| 5,311,183 | A | 5/1994 | Mathews et al. |
| 5,332,998 | A | 7/1994 | Avignon et al. |
| 5,345,241 | A | 9/1994 | Huddle |
| 5,442,364 | A * | 8/1995 | Lee .................. H01Q 3/22 342/25 C |
| 5,539,409 | A | 7/1996 | Mathews et al. |
| 5,559,515 | A | 9/1996 | Alimena et al. |
| 5,559,518 | A | 9/1996 | DiDomizio |
| 5,592,178 | A | 1/1997 | Chang et al. |
| 5,736,957 | A | 4/1998 | Raney |
| 5,820,080 | A | 10/1998 | Eschenbach |
| 5,828,332 | A | 10/1998 | Frederick |
| 5,831,570 | A | 11/1998 | Ammar et al. |
| 5,839,080 | A | 11/1998 | Muller et al. |
| 5,867,119 | A | 2/1999 | Corrubia et al. |
| 5,894,286 | A | 4/1999 | Morand et al. |
| 5,920,276 | A | 7/1999 | Frederick |
| 5,923,279 | A | 7/1999 | Bamler et al. |
| 5,936,575 | A | 8/1999 | Azzarelli et al. |
| 5,945,926 | A | 8/1999 | Ammar et al. |
| 5,978,715 | A | 11/1999 | Briffe et al. |
| 6,002,347 | A | 12/1999 | Daly et al. |
| 6,023,240 | A | 2/2000 | Sutton |
| 6,061,016 | A | 5/2000 | Lupinski et al. |
| 6,061,022 | A | 5/2000 | Menegozzi et al. |
| 6,064,942 | A | 5/2000 | Johnson et al. |
| 6,075,484 | A | 6/2000 | Daniel et al. |
| 6,092,009 | A | 7/2000 | Glover |
| 6,112,141 | A | 8/2000 | Briffe et al. |
| 6,112,570 | A | 9/2000 | Hruschak |
| 6,122,570 | A | 9/2000 | Muller et al. |
| 6,127,944 | A | 10/2000 | Daly et al. |
| 6,128,553 | A | 10/2000 | Gordon et al. |
| 6,138,060 | A | 10/2000 | Conner et al. |
| 6,150,901 | A | 11/2000 | Auken |
| 6,154,151 | A | 11/2000 | McElreath et al. |
| 6,154,169 | A | 11/2000 | Kuntman |
| 6,157,339 | A | 12/2000 | Sato et al. |
| 6,157,891 | A | 12/2000 | Lin |
| 6,163,021 | A | 12/2000 | Mickelson |
| 6,166,661 | A | 12/2000 | Anderson et al. |
| 6,169,770 | B1 | 1/2001 | Henely |
| 6,178,391 | B1 | 1/2001 | Anderson et al. |
| 6,184,816 | B1 | 2/2001 | Zheng et al. |
| 6,188,330 | B1 | 2/2001 | Glover |
| 6,194,980 | B1 | 2/2001 | Thon |
| 6,199,008 | B1 | 3/2001 | Aratow et al. |
| 6,201,494 | B1 | 3/2001 | Kronfeld |
| 6,204,806 | B1 | 3/2001 | Hoech |
| 6,205,400 | B1 | 3/2001 | Lin |
| 6,208,284 | B1 | 3/2001 | Woodell et al. |
| 6,219,592 | B1 | 4/2001 | Muller et al. |
| 6,233,522 | B1 | 5/2001 | Morici |
| 6,236,351 | B1 | 5/2001 | Conner et al. |
| 6,259,400 | B1 | 7/2001 | Higgins et al. |
| 6,266,114 | B1 | 7/2001 | Skarohlid |
| 6,278,799 | B1 | 8/2001 | Hoffman |
| 6,281,832 | B1 | 8/2001 | McElreath |
| 6,285,298 | B1 | 9/2001 | Gordon |
| 6,285,337 | B1 | 9/2001 | West et al. |
| 6,285,926 | B1 | 9/2001 | Weiler et al. |
| 6,289,277 | B1 | 9/2001 | Feyereisen et al. |
| 6,311,108 | B1 | 10/2001 | Ammar et al. |
| 6,317,468 | B1 | 11/2001 | Meyer |
| 6,317,690 | B1 | 11/2001 | Gia |
| 6,317,872 | B1 | 11/2001 | Gee et al. |
| 6,340,946 | B1 | 1/2002 | Wolfson et al. |
| 6,345,127 | B1 | 2/2002 | Mitchell |
| 6,359,585 | B1 | 3/2002 | Bechman et al. |
| 6,373,418 | B1 | 4/2002 | Abbey |
| 6,374,286 | B1 | 4/2002 | Gee et al. |
| 6,377,202 | B1 | 4/2002 | Kropfli et al. |
| 6,377,892 | B1 | 4/2002 | Johnson et al. |
| 6,388,607 | B1 | 5/2002 | Woodell |
| 6,388,608 | B1 | 5/2002 | Woodell et al. |
| 6,389,354 | B1 | 5/2002 | Hicks et al. |
| 6,401,038 | B2 | 6/2002 | Gia |
| 6,411,890 | B1 | 6/2002 | Zimmerman |
| 6,421,000 | B1 | 7/2002 | McDowell |
| 6,421,603 | B1 | 7/2002 | Pratt et al. |
| 6,424,288 | B1 | 7/2002 | Woodell |
| 6,426,717 | B1 | 7/2002 | Maloratsky |
| 6,426,720 | B1 | 7/2002 | Ross et al. |
| 6,427,122 | B1 | 7/2002 | Lin |
| 6,441,773 | B1 | 8/2002 | Kelly et al. |
| 6,445,310 | B1 | 9/2002 | Bateman et al. |
| 6,448,922 | B1 | 9/2002 | Kelly |
| 6,452,511 | B1 | 9/2002 | Kelly et al. |
| 6,456,236 | B1 | 9/2002 | Hauck et al. |
| 6,456,238 | B1 | 9/2002 | Posey |
| 6,462,703 | B2 | 10/2002 | Hedrick |
| 6,473,026 | B1 | 10/2002 | Ali-Mehenni et al. |
| 6,473,037 | B2 | 10/2002 | Vail et al. |
| 6,473,240 | B1 | 10/2002 | Dehmlow |
| 6,492,934 | B1 | 12/2002 | Hwang et al. |

(56) References Cited

U.S. PATENT DOCUMENTS

| | | |
|---|---|---|
| 6,501,424 B1 | 12/2002 | Haendel et al. |
| 6,512,476 B1 | 1/2003 | Woodell |
| 6,512,527 B1 | 1/2003 | Barber et al. |
| 6,516,272 B2 | 2/2003 | Lin |
| 6,516,283 B2 | 2/2003 | McCall et al. |
| 6,520,056 B1 | 2/2003 | Nemeth et al. |
| 6,525,674 B1 | 2/2003 | Kelly et al. |
| 6,531,669 B1 | 3/2003 | Miller et al. |
| 6,549,161 B1 | 4/2003 | Woodell |
| 6,567,728 B1 | 5/2003 | Kelly et al. |
| 6,574,030 B1 | 6/2003 | Mosier |
| 6,577,947 B1 | 6/2003 | Kronfeld et al. |
| 6,590,528 B1 | 7/2003 | DeWulf |
| 6,591,171 B1 | 7/2003 | Ammar et al. |
| 6,593,875 B2 | 7/2003 | Bergin et al. |
| 6,600,443 B2 | 7/2003 | Landt |
| 6,603,425 B1 | 8/2003 | Woodell |
| 6,650,275 B1 | 11/2003 | Kelly et al. |
| 6,650,291 B1 | 11/2003 | West et al. |
| 6,653,947 B2 | 11/2003 | Dwyer et al. |
| 6,667,710 B2 | 12/2003 | Cornell et al. |
| 6,690,298 B1 | 2/2004 | Barber et al. |
| 6,690,299 B1 | 2/2004 | Suiter |
| 6,690,317 B2 | 2/2004 | Szeto et al. |
| 6,697,008 B1 | 2/2004 | Sternowski |
| 6,697,012 B2 | 2/2004 | Lodwig et al. |
| 6,710,663 B1 | 3/2004 | Berquist |
| 6,714,186 B1 | 3/2004 | Mosier et al. |
| 6,724,344 B1 | 4/2004 | Stockmaster et al. |
| 6,731,236 B1 | 5/2004 | Hager et al. |
| 6,738,011 B1 | 5/2004 | Evans |
| 6,741,203 B1 | 5/2004 | Woodell |
| 6,741,208 B1 | 5/2004 | West et al. |
| 6,744,382 B1 | 6/2004 | Lapis et al. |
| 6,744,408 B1 | 6/2004 | Stockmaster |
| 6,757,624 B1 | 6/2004 | Hwang et al. |
| 6,771,626 B1 | 8/2004 | Golubiewski et al. |
| 6,782,392 B1 | 8/2004 | Weinberger et al. |
| 6,799,095 B1 | 9/2004 | Owen et al. |
| 6,804,614 B1 | 10/2004 | McGraw et al. |
| 6,806,846 B1 | 10/2004 | West |
| 6,807,538 B1 | 10/2004 | Weinberger et al. |
| 6,813,777 B1 | 11/2004 | Weinberger et al. |
| 6,819,983 B1 | 11/2004 | McGraw |
| 6,822,617 B1 | 11/2004 | Mather et al. |
| 6,825,804 B1 | 11/2004 | Doty |
| 6,839,017 B1 | 1/2005 | Dillman |
| 6,850,185 B1 | 2/2005 | Woodell |
| 6,862,323 B1 | 3/2005 | Loper |
| 6,862,501 B2 | 3/2005 | He |
| 6,865,452 B2 | 3/2005 | Burdon |
| 6,879,280 B1 | 4/2005 | Bull et al. |
| 6,879,886 B2 | 4/2005 | Wilkins et al. |
| 6,882,302 B1 | 4/2005 | Woodell et al. |
| 6,918,134 B1 | 7/2005 | Sherlock et al. |
| 6,933,885 B1 | 8/2005 | Stockmaster et al. |
| 6,938,258 B1 | 8/2005 | Weinberger et al. |
| 6,950,062 B1 | 9/2005 | Mather et al. |
| 6,959,057 B1 | 10/2005 | Tuohino |
| 6,972,727 B1 | 12/2005 | West et al. |
| 6,977,608 B1 | 12/2005 | Anderson et al. |
| 6,990,022 B2 | 1/2006 | Morikawa et al. |
| 6,992,614 B1 | 1/2006 | Joyce |
| 6,995,726 B1 | 2/2006 | West et al. |
| 6,998,908 B1 | 2/2006 | Sternowski |
| 6,999,022 B1 | 2/2006 | Vesel et al. |
| 6,999,027 B1 | 2/2006 | Stockmaster |
| 7,002,546 B1 | 2/2006 | Stuppi et al. |
| 7,010,398 B2 | 3/2006 | Wilkins et al. |
| 7,023,375 B2 | 4/2006 | Klausing et al. |
| 7,026,956 B1 | 4/2006 | Wenger et al. |
| 7,028,304 B1 | 4/2006 | Weinberger et al. |
| 7,034,753 B1 | 4/2006 | Elsallal et al. |
| 7,042,387 B2 | 5/2006 | Ridenour et al. |
| 7,053,796 B1 | 5/2006 | Barber |
| 7,057,549 B2 | 6/2006 | Block |
| 7,064,680 B2 | 6/2006 | Reynolds et al. |
| 7,069,120 B1 | 6/2006 | Koenck et al. |
| 7,089,092 B1 | 8/2006 | Wood et al. |
| 7,092,645 B1 | 8/2006 | Sternowski |
| 7,098,913 B1 | 8/2006 | Etherington et al. |
| 7,109,912 B1 | 9/2006 | Paramore et al. |
| 7,109,913 B1 | 9/2006 | Paramore et al. |
| 7,123,260 B2 | 10/2006 | Brust |
| 7,129,885 B1 | 10/2006 | Woodell et al. |
| 7,145,501 B1 | 12/2006 | Manfred et al. |
| 7,148,816 B1 | 12/2006 | Carrico |
| 7,151,507 B1 | 12/2006 | Herting |
| 7,158,072 B1 | 1/2007 | Venkatachalam et al. |
| 7,161,525 B1 | 1/2007 | Finley et al. |
| 7,170,446 B1 | 1/2007 | West et al. |
| 7,170,959 B1 | 1/2007 | Abbey |
| 7,180,476 B1 | 2/2007 | Guell et al. |
| 7,191,406 B1 | 3/2007 | Barber et al. |
| 7,196,329 B1 | 3/2007 | Wood et al. |
| 7,205,933 B1 | 4/2007 | Snodgrass |
| 7,209,070 B2 | 4/2007 | Gilliland et al. |
| 7,212,216 B2 | 5/2007 | He et al. |
| 7,218,268 B2 | 5/2007 | VandenBerg |
| 7,219,011 B1 | 5/2007 | Barber |
| 7,242,343 B1 | 7/2007 | Woodell |
| 7,242,345 B2 | 7/2007 | Raestad et al. |
| 7,250,903 B1 | 7/2007 | McDowell |
| 7,265,710 B2 | 9/2007 | DeAgro |
| 7,269,657 B1 | 9/2007 | Alexander et al. |
| 7,272,472 B1 | 9/2007 | McElreath |
| 7,280,068 B2 | 10/2007 | Lee et al. |
| 7,289,058 B2 | 10/2007 | Shima |
| 7,292,178 B1 | 11/2007 | Woodell et al. |
| 7,292,180 B2 | 11/2007 | Schober |
| 7,295,150 B2 | 11/2007 | Burlet et al. |
| 7,295,901 B1 | 11/2007 | Little et al. |
| 7,301,496 B2 | 11/2007 | Honda et al. |
| 7,307,576 B1 | 12/2007 | Koenigs |
| 7,307,577 B1 | 12/2007 | Kronfeld et al. |
| 7,307,583 B1 | 12/2007 | Woodell et al. |
| 7,312,725 B2 | 12/2007 | Berson et al. |
| 7,312,743 B2 | 12/2007 | Ridenour et al. |
| 7,317,427 B2 | 1/2008 | Pauplis et al. |
| 7,321,332 B2 | 1/2008 | Focke et al. |
| 7,337,043 B2 | 2/2008 | Bull |
| 7,352,292 B2 | 4/2008 | Alter et al. |
| 7,372,394 B1 | 5/2008 | Woodell et al. |
| 7,373,223 B2 | 5/2008 | Murphy |
| 7,375,678 B2 | 5/2008 | Feyereisen et al. |
| 7,379,014 B1 | 5/2008 | Woodell et al. |
| 7,379,796 B2 | 5/2008 | Walsdorf et al. |
| 7,417,578 B1 | 8/2008 | Woodell et al. |
| 7,417,579 B1 | 8/2008 | Woodell |
| 7,423,578 B1 | 9/2008 | Tietjen |
| 7,446,697 B2 | 11/2008 | Burlet et al. |
| 7,474,262 B2 | 1/2009 | Alland |
| 7,479,920 B2 | 1/2009 | Niv |
| 7,486,220 B1 | 2/2009 | Kronfeld et al. |
| 7,486,291 B2 | 2/2009 | Berson et al. |
| 7,492,304 B1 | 2/2009 | Woodell et al. |
| 7,492,305 B1 | 2/2009 | Woodell et al. |
| 7,515,087 B1 | 4/2009 | Woodell et al. |
| 7,515,088 B1 | 4/2009 | Woodell et al. |
| 7,525,448 B1 | 4/2009 | Wilson et al. |
| 7,528,765 B1 | 5/2009 | Woodell et al. |
| 7,541,970 B1 | 6/2009 | Godfrey et al. |
| 7,541,971 B1 | 6/2009 | Woodell et al. |
| 7,557,735 B1 | 7/2009 | Woodell et al. |
| 7,570,177 B2 | 8/2009 | Reynolds et al. |
| 7,576,680 B1 | 8/2009 | Woodell |
| 7,603,209 B2 | 10/2009 | Dwyer et al. |
| 7,609,200 B1 | 10/2009 | Woodell et al. |
| 7,612,706 B2 | 11/2009 | Honda et al. |
| 7,616,150 B1 | 11/2009 | Woodell |
| 7,633,428 B1 | 12/2009 | McCusker et al. |
| 7,633,430 B1 | 12/2009 | Wichgers et al. |
| 7,639,175 B1 | 12/2009 | Woodell |
| 7,664,601 B2 | 2/2010 | Daly, Jr. |

(56) References Cited

U.S. PATENT DOCUMENTS

| | | | |
|---|---|---|---|
| 7,675,461 B1 | 3/2010 | McCusker et al. |
| 7,693,621 B1 | 4/2010 | Chamas |
| 7,696,921 B1 | 4/2010 | Finley et al. |
| 7,714,767 B1 | 5/2010 | Kronfeld et al. |
| 7,733,264 B1 | 6/2010 | Woodell et al. |
| 7,783,427 B1 | 8/2010 | Woodell et al. |
| 7,783,429 B2 | 8/2010 | Walden et al. |
| 7,791,529 B2 | 9/2010 | Filias et al. |
| 7,808,422 B1 | 10/2010 | Woodell et al. |
| 7,843,380 B1 | 11/2010 | Woodell |
| 7,859,448 B1 | 12/2010 | Woodell et al. |
| 7,859,449 B1 | 12/2010 | Woodell et al. |
| 7,864,103 B2 | 1/2011 | Weber et al. |
| 7,868,811 B1 | 1/2011 | Woodell et al. |
| 7,872,594 B1 | 1/2011 | Vesel |
| 7,889,117 B1 | 2/2011 | Woodell et al. |
| 7,889,118 B1 | 2/2011 | Finley et al. |
| 7,965,223 B1 | 6/2011 | McCusker |
| 7,965,225 B1 | 6/2011 | Dickerson et al. |
| 8,035,547 B1 | 10/2011 | Flanigan et al. |
| 8,059,025 B2 | 11/2011 | D'Addio |
| 8,068,984 B2 | 11/2011 | Smith et al. |
| 8,072,368 B1 | 12/2011 | Woodell |
| 8,077,078 B1 | 12/2011 | Woodell et al. |
| 8,140,223 B2 | 3/2012 | Whitehead et al. |
| 8,159,464 B1 | 4/2012 | Gribble et al. |
| 8,232,917 B2 | 7/2012 | Scherzinger et al. |
| 8,296,065 B2 | 10/2012 | Haynie et al. |
| 8,373,580 B2 | 2/2013 | Bunch et al. |
| 8,410,975 B1 | 4/2013 | Bell et al. |
| 8,477,062 B1 | 7/2013 | Kanellis |
| 8,493,241 B2 | 7/2013 | He |
| 8,515,600 B1 | 8/2013 | McCusker |
| 8,558,731 B1 | 10/2013 | Woodell |
| 8,576,112 B2 | 11/2013 | Garrec et al. |
| 8,583,315 B2 | 11/2013 | Whitehead et al. |
| 8,594,879 B2 | 11/2013 | Roberge et al. |
| 8,603,288 B2 | 12/2013 | Sampica et al. |
| 8,634,993 B2 | 1/2014 | McClure et al. |
| 8,639,416 B2 | 1/2014 | Jones et al. |
| 8,643,533 B1 | 2/2014 | Woodell et al. |
| 8,691,043 B2 | 4/2014 | Sampica et al. |
| 8,717,226 B2 | 5/2014 | Bon et al. |
| 8,936,057 B2 | 1/2015 | Sampica et al. |
| 2001/0023390 A1 | 9/2001 | Gia |
| 2002/0039070 A1 | 4/2002 | Ververs et al. |
| 2002/0111717 A1 | 8/2002 | Scherzinger et al. |
| 2002/0116125 A1 | 8/2002 | Lin |
| 2002/0116126 A1 | 8/2002 | Lin |
| 2002/0158256 A1 | 10/2002 | Yamada et al. |
| 2002/0185600 A1 | 12/2002 | Kerr |
| 2003/0021491 A1 | 1/2003 | Brust |
| 2003/0071828 A1 | 4/2003 | Wilkins et al. |
| 2003/0093187 A1* | 5/2003 | Walker ............... B64C 13/20 701/1 |
| 2003/0102999 A1 | 6/2003 | Bergin et al. |
| 2003/0160718 A1 | 8/2003 | Nagasaku |
| 2003/0195672 A1 | 10/2003 | He |
| 2003/0216859 A1 | 11/2003 | Martell et al. |
| 2003/0222887 A1 | 12/2003 | Wilkins et al. |
| 2004/0044445 A1 | 3/2004 | Burdon |
| 2004/0059473 A1 | 3/2004 | He |
| 2004/0072575 A1 | 4/2004 | Young et al. |
| 2004/0083038 A1 | 4/2004 | He |
| 2004/0160341 A1 | 8/2004 | Feyereisen et al. |
| 2004/0160364 A1* | 8/2004 | Regev ................. G01S 3/46 342/432 |
| 2004/0181318 A1 | 9/2004 | Redmond et al. |
| 2004/0264549 A1 | 12/2004 | Hoole |
| 2005/0004748 A1* | 1/2005 | Pinto ................. G01C 21/165 701/470 |
| 2005/0052451 A1 | 3/2005 | Servantie |
| 2005/0174350 A1 | 8/2005 | Ridenour et al. |
| 2005/0200502 A1 | 9/2005 | Reusser et al. |
| 2005/0230563 A1* | 10/2005 | Corcoran, III ......... G05D 1/104 244/175 |
| 2006/0004497 A1 | 1/2006 | Bull |
| 2006/0097895 A1 | 5/2006 | Reynolds et al. |
| 2006/0164284 A1 | 7/2006 | Pauplis et al. |
| 2006/0227012 A1 | 10/2006 | He |
| 2006/0244636 A1 | 11/2006 | Rye et al. |
| 2006/0290531 A1 | 12/2006 | Reynolds et al. |
| 2007/0001897 A1 | 1/2007 | Alland |
| 2007/0002078 A1 | 1/2007 | He et al. |
| 2007/0008214 A1 | 1/2007 | Wasiewicz |
| 2007/0013575 A1 | 1/2007 | Lee et al. |
| 2007/0018887 A1 | 1/2007 | Feyereisen et al. |
| 2007/0032951 A1 | 2/2007 | Tanenhaus et al. |
| 2007/0060063 A1 | 3/2007 | Wright et al. |
| 2007/0146364 A1 | 6/2007 | Aspen |
| 2007/0171094 A1 | 7/2007 | Alter et al. |
| 2007/0176794 A1 | 8/2007 | Feyereisen et al. |
| 2007/0247350 A1 | 10/2007 | Ryan |
| 2007/0279253 A1 | 12/2007 | Priest |
| 2008/0018524 A1 | 1/2008 | Christianson |
| 2008/0051947 A1 | 2/2008 | Kemp |
| 2008/0074308 A1 | 3/2008 | Becker et al. |
| 2008/0111731 A1 | 5/2008 | Hubbard et al. |
| 2008/0180351 A1 | 7/2008 | He |
| 2009/0040070 A1 | 2/2009 | Alter et al. |
| 2009/0152391 A1* | 6/2009 | McWhirk ................ B64B 1/02 244/30 |
| 2009/0164067 A1 | 6/2009 | Whitehead et al. |
| 2009/0207048 A1 | 8/2009 | He et al. |
| 2010/0033499 A1 | 2/2010 | Gannon et al. |
| 2010/0312428 A1 | 12/2010 | Roberge et al. |
| 2010/0312461 A1 | 12/2010 | Haynie et al. |
| 2011/0054729 A1 | 3/2011 | Whitehead et al. |
| 2011/0282580 A1 | 11/2011 | Mohan |
| 2012/0053831 A1 | 3/2012 | Halder |
| 2012/0150426 A1 | 6/2012 | Conway |
| 2012/0174445 A1 | 7/2012 | Jones et al. |
| 2012/0215410 A1 | 8/2012 | McClure et al. |
| 2013/0041529 A1 | 2/2013 | He et al. |

OTHER PUBLICATIONS

U.S. Appl. No. 11/863,219, filed Sep. 27, 2007, Woodell.
U.S. Appl. No. 11/863,221, filed Sep. 27, 2007, Woodell.
U.S. Appl. No. 11/899,801, filed Sep. 6, 2007, Woodell et al.
U.S. Appl. No. 11/900,002, filed Sep. 6, 2007, Woodell et al.
U.S. Appl. No. 12/167,200, filed Jul. 2, 2008, Woodell et al.
U.S. Appl. No. 12/167,203, filed Jul. 2, 2008, Woodell.
U.S. Appl. No. 12/167,208, filed Jul. 2, 2008, Dickerson et al.
U.S. Appl. No. 12/180,293, filed Jul. 25, 2008, Woodell et al.
U.S. Appl. No. 12/236,464, filed Sep. 23, 2008, Rockwell Collins.
U.S. Appl. No. 13/224,992, filed Sep. 2, 2011, Hufnagel et al.
U.S. Appl. No. 13/250,307, filed Sep. 30, 2011, Jinkins.
U.S. Appl. No. 13/250,798, filed Sep. 30, 2011, Jinkins.
U.S. Appl. No. 13/627,788, filed Sep. 26, 2012, Rockwell Collins.
U.S. Appl. No. 13/857,955, filed Apr. 5, 2013, Barber et al.
U.S. Appl. No. 13/250,798, filed Sep. 30, 2011, Rockwell Collins.
U.S. Appl. No. 14/301,199, filed Jun. 10, 2014, Rockwell Collins.
U.S. Appl. No. 14/482,681, filed Sep. 10, 2014, Rockwell Collins.
"MountainScope™ on a TabletPC," PCAvionics™, printed from website www.pcavionics.com on Aug. 28, 2007, 1 page.
TAWS Class A and Class B, Terrain Awareness and Warning Systems, Universal® Avionics Systems Corporation, Sep. 2007, 6 pages.
"TAWS Terrain Awareness and Warning System," Universal® Avionics, printed from website www.uasc.com on Aug. 28, 2007, 2 pages.
Adams, Charlotte, "Synthetic Vision: Picturing the Future," Avionics magazine, Oct. 1, 2006, printed from website www.aviationtoday.com, 4 pages.
Adams, Charlotte, "Synthetic Vision: Picturing the Future," Avionics magazine, Solutions for Global Airspace Electronics, Oct. 2006, cover and pp. 22-29.
Airports Authority of India, Chapter 7: Visual Aids for Navigation—Lights, available prior to Jan. 1, 2005, retrieved from the internet at: http://www.aai.aero/aai_employees/chapter_7.pdf on Sep. 26, 2014, 33 pages.

(56) References Cited

OTHER PUBLICATIONS

Blue Mountain Avionics' Products, printed from website www.bluemountainavionics.com on Aug. 28, 2007, 4 pages.
Brailovsky et al., REVS122: A Radar-Based Enhanced Vision System for Degraded Visual Environments, Proc. of SPIE vol. 9087 908708-1, retrieved from the internet at http://proceedings.spiedigitallibrary.org on Jun. 25, 2014, 13 pages.
Carter, S. P., D. D. Blankenship, M. E. Peters, D. A. Young, J. W. Holt, and D. L. Morse (2007), Radar-based subglacial lake classification in Antarctica, Geochem. Geophys. Geosyst., 8, 003016, doi:10.1029/2006GC001408, 20 pages.
Federal Aviation Administration, Advisory Circular AC 90-106, "Enhanced Flight Vision Systems", initiated by AFS-400, dated Jun. 2, 2010, 55 pages.
Federal Aviation Administration, Aeronautical Information Manual (AIM) Basic Flight Information and ATC Procedures, dated Jul. 24, 2014, 2 pages.
Final Office Action on U.S. Appl. No. 13/250,798 dated Sep. 4, 2014, 22 pages.
Final Office Action on U.S. Appl. No. 13/250,307 Dated Jun. 11, 2014, 8 pages.
Final Office Action on U.S. Appl. No. 13/250,798 Dated Aug. 7, 2015, 21 pages.
Fountain, J.R., Digital Terrain Systems, Airborne Navigation Systems Workshop (Digest No. 1997/169), IEE Colloquium, pp. 4/1-4/6, Feb. 21, 1997.
G2000, Garmin, printed from website https://buy.garmin.com/shop/shop.do?cID=153&pID=97668 on Jun. 28, 2011, 2 pages.
G3000, Garmin, printed from website https://buy.garmin.com/shop/shop.do?cID=153&pID=66916 on Jun. 28, 2011, 2 pages.
G5000, Garmin, printed from website https://buy.garmin.com/shop/shop.do?cID=153&pID=90821&ra=true on Apr. 20, 2011, 2 pages.
Honeywell, RDR-4B Forward looking windshear detection / weather radar system user's manual with radar operating guidelines, Rev. 6, Jul. 2003, 106 pages.
Johnson, A., et al., Vision Guided Landing of an Autonomous Helicopter in Hazardous Terrain, Robotics and Automation, 2005. ICRA 2005. Proceedings of the 2005 IEEE International Conference, pp. 3966-3971, Apr. 18-22, 2005.
Kuntman, D., Airborne system to address leading cause of injuries in non-fatal airline accidents, ICAO Journal, Mar. 2000, 4 pages.
Non-Final Office Action on U.S. Appl. No. 13/250,798 Dated Mar. 18, 2015, 21 pages.
Non-Final Office Action on U.S. Appl. No. 14/301,199 dated Sep. 9, 2015, 18 pages.
Notice of Allowance for U.S. Appl. No. 11/863,215, mail date Oct. 13, 2009, 8 pages.
Notice of Allowance for U.S. Appl. No. 11/863,219, mail date Jun. 23, 2009, 7 pages.
Notice of Allowance for U.S. Appl. No. 11/863,221, mail date Aug. 2, 2010, 9 pages.
Notice of Allowance for U.S. Appl. No. 11/899,801, mail date Aug. 19, 2010, 5 pages.
Notice of Allowance for U.S. Appl. No. 11/900,002, mail date Sep. 14, 2010, 5 pages.
Notice of Allowance for U.S. Appl. No. 12/167,200, mail date Oct. 28, 2010, 5 pages.
Notice of Allowance for U.S. Appl. No. 12/167,203, mail date Jun. 21, 2013, 7 pages.
Notice of Allowance for U.S. Appl. No. 12/167,208, mail date Mar. 21, 2011, 8 pages.
Notice of Allowance for U.S. Appl. No. 12/180,293, mail date Aug. 4, 2011, 8 pages.
Notice of Allowance on U.S. Appl. No. 13/241,051 Dated Aug. 28, 2014, 9 pages.
Notice of Allowance on U.S. Appl. No. 13/247,742 Dated Jul. 30, 2014, 9 pages.
Office Action for U.S. Appl. No. 11/851,323, mail date Dec. 15, 2010, 13 pages.
Office Action for U.S. Appl. No. 11/851,323, mail date Aug. 6, 2009, 23 pages.
Office Action for U.S. Appl. No. 11/851,323, mail date Jul. 5, 2012, 23 pages.
Office Action for U.S. Appl. No. 11/863,215, mail date May 27, 2009, 5 pages.
Office Action for U.S. Appl. No. 11/863,215, mail date Nov. 12, 2008, 8 pages.
Office Action for U.S. Appl. No. 11/863,219, mail date Dec. 12, 2008, 7 pages.
Office Action for U.S. Appl. No. 11/863,221, mail date Dec. 18, 2009, 5 pages.
Office Action for U.S. Appl. No. 11/863,221, mail date Dec. 8, 2008, 8 pages.
Office Action for U.S. Appl. No. 11/863,221, mail date May 26, 2009, 5 pages.
Office Action for U.S. Appl. No. 12/167,200, mail date Jul. 21, 2010, 6 pages.
Office Action for U.S. Appl. No. 12/167,203, mail date Aug. 26, 2010, 9 pages.
Office Action for U.S. Appl. No. 12/167,203, mail date Jul. 20, 2011, 6 pages.
Office Action for U.S. Appl. No. 12/167,203, mail date Mar. 7, 2013, 5 pages.
Office Action for U.S. Appl. No. 12/167,203, mail date Oct. 31, 2011, 5 pages.
Office Action for U.S. Appl. No. 12/167,203, mail date Sep. 21, 2012, 6 pages.
Office Action for U.S. Appl. No. 12/167,208, mail date Dec. 30, 2009, 10 pages.
Office Action for U.S. Appl. No. 12/167,208, mail date Feb. 7, 2011, 8 pages.
Office Action for U.S. Appl. No. 12/167,208, mail date Jun. 3, 2010, 11 pages.
Office Action for U.S. Appl. No. 12/167,208, mail date Oct. 19, 2010, 8 pages.
Office Action for U.S. Appl. No. 12/180,293, mail date Jan. 4, 2011, 5 pages.
Office Action for U.S. Appl. No. 12/180,293, mail date Jul. 28, 2010, 8 pages.
Office Action for U.S. Appl. No. 12/263,282, mail date Jan. 5, 2012, 10 pages.
Office Action for U.S. Appl. No. 12/892,563, mail date Feb. 19, 2013, 12 pages.
Office Action for U.S. Appl. No. 12/976,871, mail date Feb. 15, 2012, 8 pages.
Office Action for U.S. Appl. No. 12/976,871, mail date Jul. 10, 2012, 4 pages.
Office Action for U.S. Appl. No. 12/976,871, mail date May 6, 2013, 5 pages.
Office Action for U.S. Appl. No. 12/976,871, mail date Nov. 21, 2012, 5 pages.
Office Action for U.S. Appl. No. 12/976,871, mail date Oct. 9, 2013, 5 pages.
Office Action for U.S. Appl. No. 13/183,314, mail date Aug. 14, 2013, 11 pages.
Office Action for U.S. Appl. No. 13/183,314, mail date Mar. 28, 2013, 12 pages.
Office Action for U.S. Appl. No. 13/224,992, mail date Feb. 28, 2013, 10 pages.
Office Action for U.S. Appl. No. 13/250,307, mail date Nov. 5, 2013, 11 pages.
Office Action for U.S. Appl. No. 13/474,559, mail date Aug. 28, 2013, 10 pages.
Office Action for U.S. Appl. No. 13/474,559, mail date Dec. 28, 2012, 8 pages.
Office Action for U.S. Appl. No. 13/743,182, mail date Apr. 8, 2013, 10 pages.
Office Action on U.S. Appl. No. 12/236,464, mail date Jul. 12, 2013, 17 pages.
Office Action on U.S. Appl. No. 11/787,460, mail date Mar. 19, 2010, 16 pages.

(56) References Cited

OTHER PUBLICATIONS

Office Action on U.S. Appl. No. 11/787,460, mail date Sep. 16, 2009, 15 pages.
Office Action on U.S. Appl. No. 12/236,464, mail date Feb. 11, 2014, 21 pages.
Office Action on U.S. Appl. No. 12/236,464, mail date Jun. 22, 2011, 14 pages.
Office Action on U.S. Appl. No. 12/892,563, mail date May 7, 2013, 6 pages.
Office Action on U.S. Appl. No. 12/892,563, mail date Oct. 10, 2012, 12 pages.
Office Action on U.S. Appl. No. 13/241,051 Dated Feb. 27, 2014, 21 pages.
Office Action on U.S. Appl. No. 13/247,742 Dated Dec. 3, 2013, 11 pages.
Office Action on U.S. Appl. No. 13/250,798 Dated Apr. 23, 2014, 15 pages.
Office Action on U.S. Appl. No. 13/627,788, mail date Jul. 28, 2014, 10 pages.
Office Action U.S. Appl. No. 11/787,460, mail date Aug. 31, 2010, 18 pages.
Pictures of DELPHINS, printed from website www.tunnel-in-the-sky.tudelft.nl on Aug. 28, 2007, 4 pages.
REVS Product Information Sheet, Sierra Nevada Corporation, dated May 7, 2014, 2 pages.
Skolnik, Introduction to Radar Systems, McGraw Hill Book Company, 2001, 3 pages.
Skolnik, Radar Handbook (McGraw Hill Book Company), 1990, 23 pages.
Synthetic Vision System, en.wikipedia.org/wiki/Synthetic_vision_system, retrieved Feb. 28, 2013, 4 pages.
Technical Standard Order, TSO-C115b, Airborne Area Navigation Equipment Using Multi-Sensor Inputs, Department of Transportation, Federal Aviation Administration, Sep. 30, 1994, 11 pages.
US Office Action on U.S. Appl. No. 11/900,002 Dated Jun. 8, 2010, 7 pages.
US Office Action on U.S. Appl. No. 13/247,742 Dated Apr. 16, 2014, 15 pages.
Vadlamani, A., et al., Improving the detection capability of spatial failure modes using downward-looking sensors in terrain database integrity monitors, Digital Avionics Systems Conference, 2003. DASC-03. The 22nd, vol. 2, pp. 9C.5-91-12 vol. 2, Oct. 12-16, 2003.
Van Kasteren, Joost, "Tunnel-in-the-Sky, Synthetic vision simplifies the pilot's job and enhances safety," printed from website www.delftoutlook.tudelft.nl on Aug. 28, 2007, 13 pages.
Wang et al., A Simple Based on DSP Antenna Controller of Weather Radar, 2001 CIE International Conference, 4 pages.
Non-Final Office Action on U.S. Appl. No. 13/250,798 dated Feb. 26, 2016, 9 pages.
Notice of Allowance on U.S. Appl. No. 14/301,199 dated Mar. 1, 2016, 11 pages.

\* cited by examiner

FIG. 11

SYSTEM AND METHOD FOR GROUND NAVIGATION

BACKGROUND

The present disclosure relates generally to the field of aircraft navigation. More particularly, the disclosure relates to aircraft navigation using multiple radar antennas.

Conventional efforts in aircraft to implement tactical situation awareness displays and situational awareness displays with a track-up orientation for low-visibility surface operations are hampered by low quality navigation systems that support ground operations. Inertial Navigation Simulators (INS), Altitude Heading Reference Systems (AHRS), and Air Data Computers (ADC) do not provide velocity and/or heading data at speeds below about 40 or 50 knots (e.g., at taxiing speed). Magnetic compasses can provide heading information, but operate poorly during ground operations due to interference from ground infrastructure.

Velocity and track (heading) can be derived from GPS position data, but when the aircraft is stationary or performing low speed turning operations (e.g., turning 90 degrees from a hold line onto a runway) cannot be adequately measured by changes in aircraft position without using a Satellite Based Augmentation System (SBAS) to obtain additional messages broadcast by satellites or a Ground Based Augmentation System (GBAS) to obtain additional ground-based radio messages.

A GPS does provide accurate position information (latitude, longitude, and altitude). Aircraft velocity and track can be determined from a change in aircraft position over time. If more than one GPS antenna is installed, aircraft heading can be determined or derived from the difference between the two positions. However, the error in a standard positioning system is greater than the length of most aircraft. SBAS can bring the nominal error down to 7.5 meters 95% of the time and GBAS can bring the nominal error down to 2 meters 95% of the time, however, the smaller the aircraft, the closer the two antennas must be. For many aircraft, the distance between the two antennas is less than the error for standard GPS and not much bigger than the error for a system including an SBAS or GBAS. Further, GPS is subject to multi-path problems during ground operations.

Therefore, what is needed is a high quality navigation system and method for implementing with tactical situation awareness displays and situational awareness displays with a track-up orientation for low-visibility surface operations. What is also needed is a system and method for accurately providing velocity and heading information of an aircraft during low speed maneuvers or when stationary.

SUMMARY

One embodiment of the disclosure relates to a navigation system for use on an aircraft for determining a heading, velocity, and/or position of the aircraft. The navigation system includes a first radar antenna for mounting to a first wing of the aircraft and configured to receive radar returns and a second radar antenna for mounting to a second wing of the aircraft and configured to receive radar returns where the first wing and the second wing extend from opposite sides of the aircraft. The navigation system also includes processing electronics configured to determine a velocity of the first and second wings based on the radar returns. The processing electronics calculate the heading, velocity, and/or position of the aircraft based on the determined wing velocities.

Another embodiment of the disclosure relates to a method for determining a heading, velocity, and/or position of an aircraft. The method includes receiving a first radar return at a radar antenna for mounting to a first wing of the aircraft and receiving a second radar return at a radar antenna mounted to a second wing of the aircraft where the first wing and the second wing extend from opposite sides of the aircraft. The method also includes determining a velocity of each wing based on the radar returns using processing electronics and calculating the heading, velocity, and/or position of the aircraft based on the determined wing velocities using the processing electronics.

Another embodiment of the disclosure relates to an apparatus for determining a heading, velocity, and/or position of an aircraft. The apparatus includes means for receiving a first radar return at a first wing of the aircraft and means for receiving a second radar return at a second wing of the aircraft where the first wing and the second wing extend from opposite sides of the aircraft. The apparatus also includes means for determining a velocity of each wing based on the radar returns and means for calculating the heading, velocity, and/or position of the aircraft based on the determined wing velocities.

BRIEF DESCRIPTION OF THE DRAWINGS

The disclosure will become more fully understood from the following detailed description, taken in conjunction with the accompanying drawings.

DETAILED DESCRIPTION OF THE EXEMPLARY EMBODIMENTS

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring generally to the figures, a system and method for determining a heading, velocity, and/or position of an aircraft is shown. The system can include an electronic display, a weather radar or other type of radar system, and a navigation system. The method can include receiving radar returns at the wings of the aircraft, determining a velocity of each wing based on the radar returns, and calculating the heading, velocity, and/or position of the aircraft based on the determined wing velocities.

Figure 1:
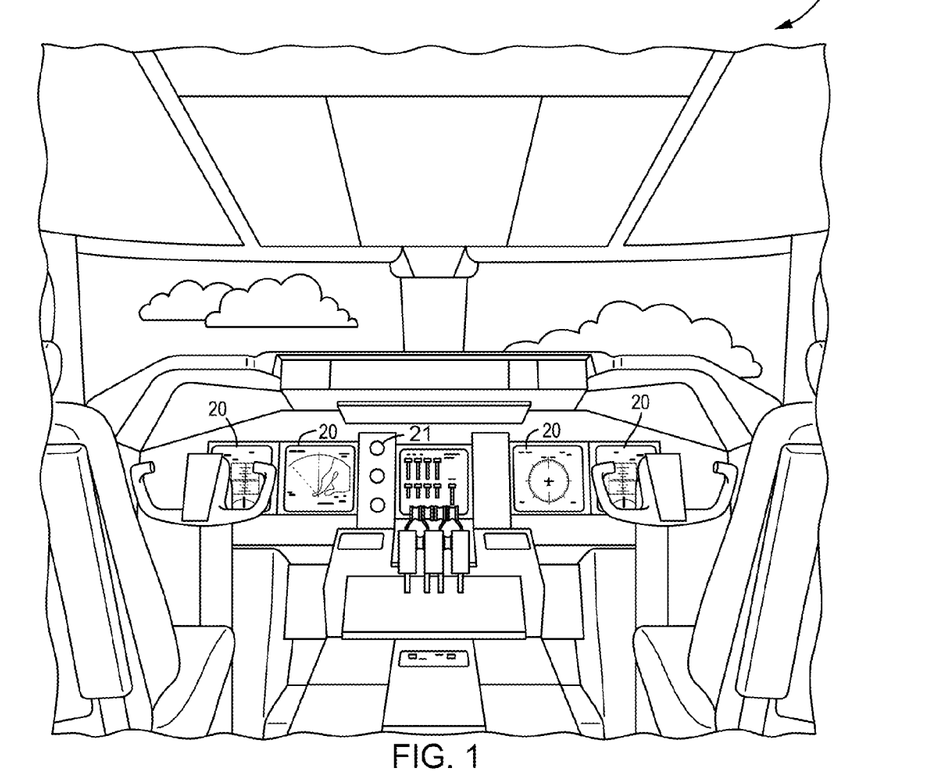
FIG. 1 is an illustration of an aircraft control center or cockpit according to an exemplary embodiment.

Referring to FIG. 1, an illustration of an aircraft control center or cockpit 10 is shown, according to one exemplary embodiment. Aircraft control center 10 includes flight displays 20. Flight displays 20 can be used to provide information to the flight crew, thereby increasing visual range and enhancing decision-making abilities. According to an exemplary embodiment, at least one of the displays of the flight displays 20 is configured to provide an indication to a flight crew as to the velocity, heading, and/or position of the aircraft.

In an exemplary embodiment, flight displays 20 can provide an output from a radar system of the aircraft. Flight displays 20 can include displays used for surface operations, such as an electronic moving map of an airport with an indication of present position. Such a display with a moving map may include user selectable options for providing the map with a north-up or track-up mode of operation. Flight displays 20 may include cultural features, for example buildings, signage, lighting structures, trees, etc.

Flight displays 20 can also include a weather display, a joint display, a weather radar map, and a terrain or obstacle display. Further, flight displays 20 may include an electronic display or a synthetic vision system (SVS). For example, flight displays 20 can include a display configured to display a three dimensional perspective image of terrain, obstacle, and/or weather information. Other view of terrain, obstacles, and/or weather information may also be provided (e.g. plan view, horizontal view, vertical view, etc.). Additionally, flight displays 20 can be implemented using any of a variety of display technologies, including CRT, LCD, organic LED, dot matrix display, and others. Flight displays 20 can also include head-up displays (HUD) with or without a projector.

Aircraft control center 10 additionally includes one or more user interface (UI) elements 21. UI elements 21 can include dials, switches, buttons, touch screens, or any other user input device. UI elements 21 can be used to adjust features of flight displays 20, such as contrast, brightness, width, and length. UI elements 21 can also (or alternatively) be used by an occupant to interface with or change the displays of flight displays 20. UI elements 21 can additionally be used to calibrate or adjust an indication of aircraft heading, velocity, and/or position provided by flight displays 20. Further, UI elements 21 can be used to calibrate or set an aircraft configuration used to determine the aircraft heading, velocity, and/or position.

Figure 2:
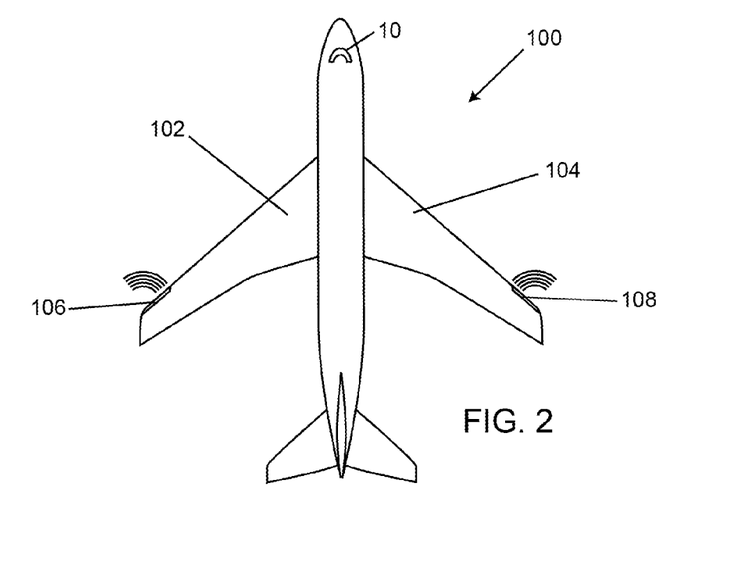
FIG. 2 is an overhead view of an aircraft including an aircraft control center and radar system according to an exemplary embodiment.

Referring to FIG. 2, an overhead view of an aircraft 100 is shown with aircraft control center 10, left wing 102, and right wing 104 according to an exemplary embodiment. Wings 102 and 104 each include a radar sensor or antenna 106 and 108, respectively. While radar antennas 106 and 108 are shown at the tips of wings 106 and 108, according to other exemplary embodiments radar antennas 106 and 108 can be located anywhere along respective wings 106 and 108 as long as the antennas are generally equal in distance from the center or fuselage of aircraft 100. According to other exemplary embodiments, radar antennas 106 and 108 can be located on the tail wings of aircraft 100. Radar antennas 106 and 108 are each configured to transmit radar pulses and receive radar returns independent of one another. According to various exemplary embodiments, radar antennas 106 and 108 can be any radar antenna capable of transmitting radar pulses and receiving radar returns, for example transmitting pulses towards ground targets and receiving associated returns.

According to some exemplary embodiments, radar antennas 106 and 108 may be generally short-range radar sensors. Radar antennas 106 and 108 may be configured to transmit radar pulses to locate potential obstructions relative to the position of the aircraft, for example lighting systems, signage, other aircraft, ground vehicles, etc. The radar returns received by radar antennas 106 and 108 may also be used to determine the velocity of the wings 102 and 104 relative to the ground. Heading or track rate can be derived from the difference in the velocity of left and right wings 102 and 104. The velocity of wings 102 and 104 can also be used to determine velocity of aircraft 100.

Figure 3A:
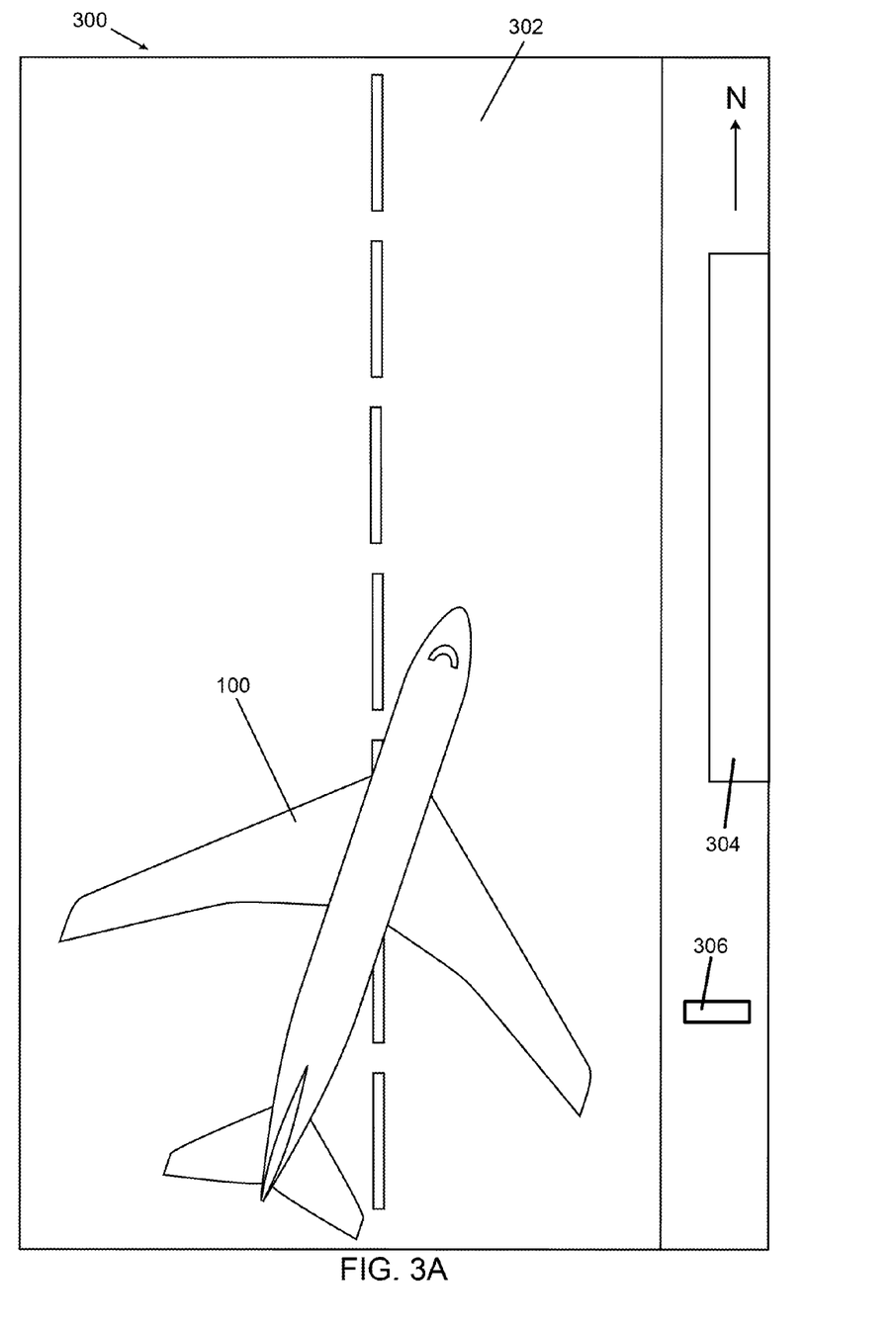
FIG. 3A is an overhead view of a map with a north-up orientation on a display screen according to an exemplary embodiment.

Referring to FIG. 3A, an electronic display 300 is shown, according to an exemplary embodiment. Electronic display 300 may be generally configured for use with surface operations and display an electronic moving map of an airport with an indication of the present position of aircraft 100. Display 300 includes indications of a runway/taxiway 302, a building 304, and signage 306, but can include indications of other cultural features or obstacles (e.g., lighting structures, towers, etc.) Display 300 can also be configured to illustrate other aircraft or terrain near runway/taxiway 302. Display 300 is shown with a north-up orientation and the illustrated map updates as aircraft 100 moves, but north remains at the top of the screen.

Figure 3B:
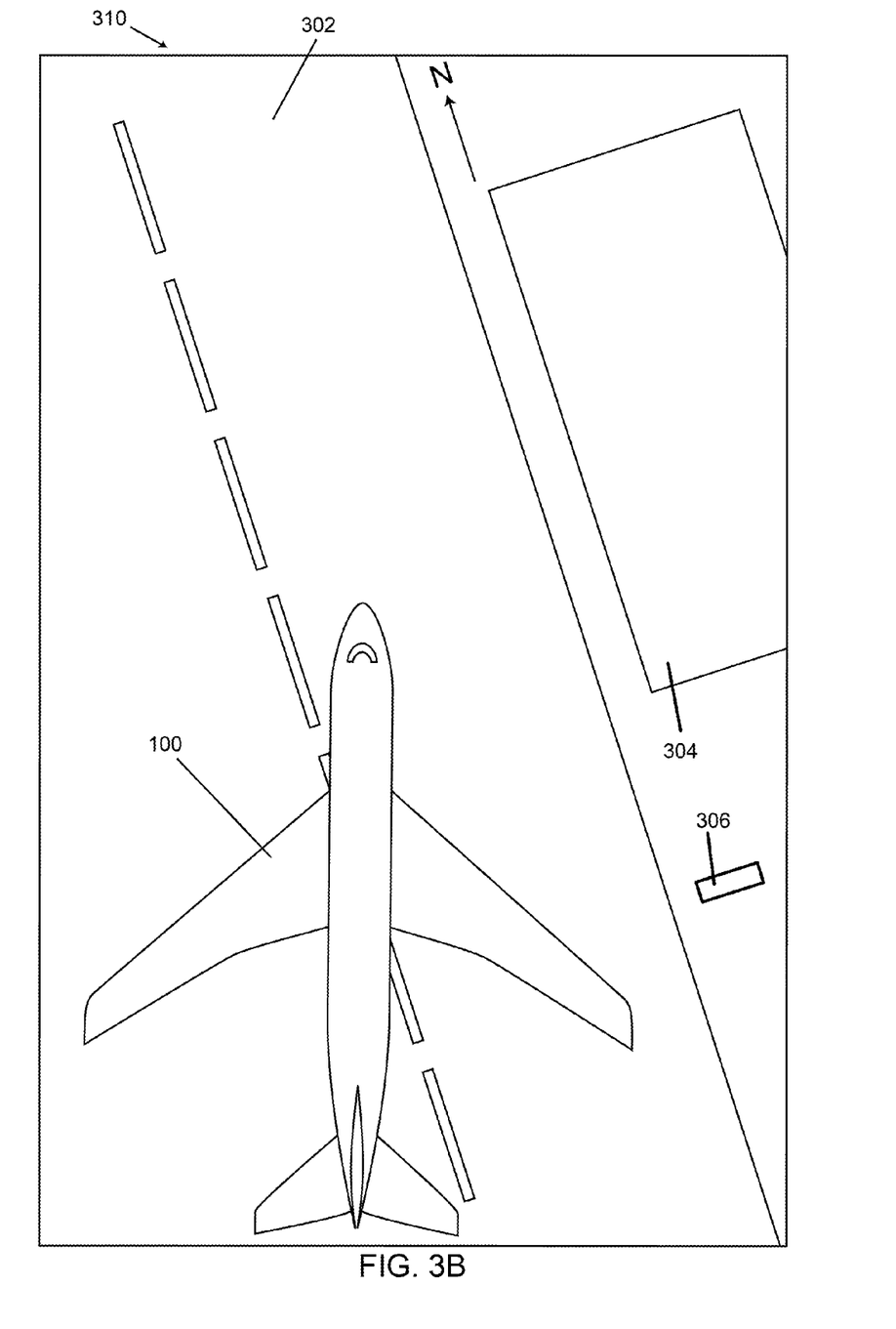
FIG. 3B is an overhead view of a map with a track-up orientation on a display screen according to an exemplary embodiment.

Referring also to FIG. 3B, an electronic display 310 is similar to electronic display 300, but has a track-up orientation according to an exemplary embodiment. The map moves or illustrates updates as aircraft 100 moves, but the with an orientation where the nose of aircraft 100 remains pointing at the top of the screen. Electronics display 300 and/or 310 may include user selectable options for providing the map with a north-up or track-up mode of operation as desired.

According to an exemplary embodiment, the color of the obstacles shown in electronic display 300 or 310 may be configured to be different colors to allow the aircrew to quickly recognize a potential hazard. For example, the obstacle may be configured to flash, enlarge, turn red or any combination thereof to provide a warning signal to the aircrew. Alternatively, electronic display 300 or 310 may be configured to provide an indicator to warn the flight crew of nearby obstacles or obstacles in the aircraft path. The indicator can be an icon, text, string, symbol, synthetic image, LED indicator, audible tone, or any other visible and/or audible alarm provided by electronic display 300 or 310, another aircraft display, an audio system, etc.

Figure 4:
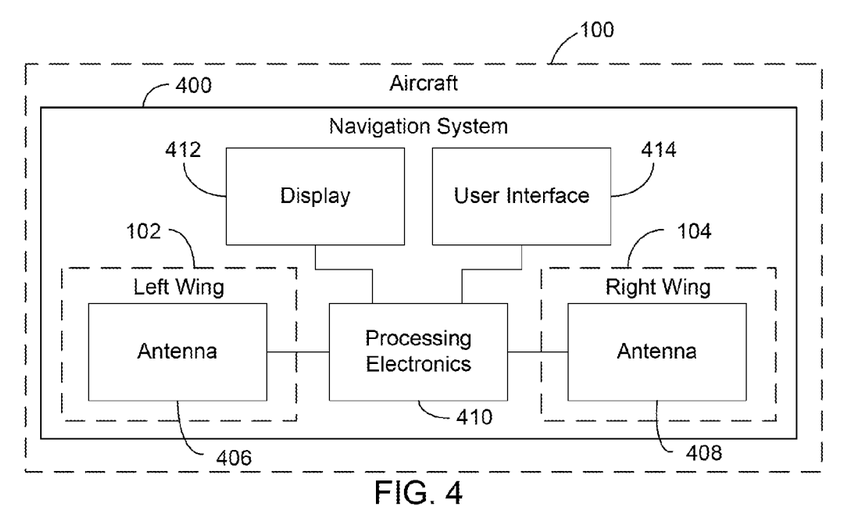
FIG. 4 is a block diagram of a radar system for the aircraft of FIG. 2 according to an exemplary embodiment.

Referring to FIG. 4, a navigation system 400 is configured to determine and provide velocity, heading, and/or position data of aircraft 100. Navigation system 400 may also determine and provide obstacle avoidance information. Navigation system 400 generally includes a radar antenna 406 on left wing 102, a radar antenna 408 on right wing 104, processing electronics 410, a display 412, and a user interface 414. Radar antennas 406 and 408 are configured in a similar manner as described with reference to radar antennas 106 and 108 of FIG. 2. Radar antennas 406 and 408 are generally configured to cast one or more radar beams from, and to receive radar returns. Radar antennas 406 and 408 may perform multiple radar sweeps. The radar sweeps can include horizontal sweeps, vertical sweeps, or a combination of horizontal and vertical sweeps. Radar antennas 406 and 408 can be steered or directed in various directions in order to perform the radar sweeps.

Processing electronics 410 are configured to interpret radar returns received at radar antennas 406 and 408. Processing electronics 410 may determine a velocity of first and second wings 102 and 104 based on radar returns received at radar antennas 406 and 408. According to various exemplary embodiments, the velocity of wings 104 and 106 may be relative to the ground, relative to each other, relative to terrain or an obstacle, relative to weather, etc. For example, the velocity of wings 104 and 106 can be determined relative to a runway, a taxiway, signage, a building, or other ground structure. Based on the determined velocity of wings 102 and 104, processing electronics 410 can calculate the heading, velocity, and/or position of the aircraft relative to the ground, to terrain or an obstacle, to weather, etc. The heading may be determined by comparing the wing velocities. If the wing velocities are the same, the aircraft is moving in a straight line or stationary. If the wing velocities are different, the aircraft is turning. The wing with the higher velocity is the outside wing of the turn (e.g., if left wing 102 is faster, the aircraft is turning right and vice versa). The position of the aircraft can be determined from a history of velocity and heading determinations from an initial starting position.

Processing electronics 410 can also be configured to use the radar return data to determine navigation solutions to stay centered in runways and taxiways in order to avoid fixed obstacles such as signage, lighting, etc. and/or to avoid traffic (e.g., aircraft and ground vehicles). According to various exemplary embodiments, processing electronics 410 can be any hardware and/or software processor or processing architecture capable of executing instructions and processing radar returns.

Display 412 (e.g., an electronic display) can be used to display information from processing electronics 410, for example obstacle avoidance data and/or velocity, heading, and/or position data of aircraft 100. According to various exemplary embodiments, display 412 can be similar to display 32 or can be any other display capable of providing velocity, heading, and/or position data of the aircraft. User interface 414 can be used to select what data is shown on display 412 or to select aircraft configuration. For example, obstacle avoidance data, velocity data, heading data, and/or position data.

Figure 5:
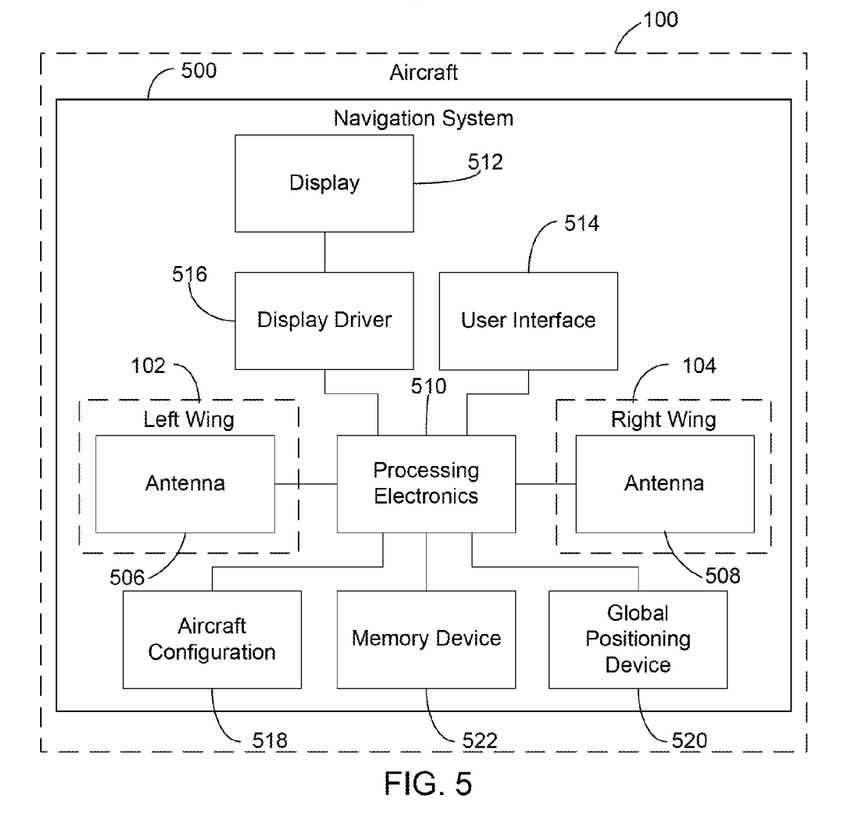
FIG. 5 is a block diagram of a radar system for the aircraft of FIG. 2 according to another exemplary embodiment.

Referring to FIG. 5, a navigation system 500 is configured to determine and provide velocity, heading, and/or position data of aircraft 100. Navigation system 500 may also determine and provide obstacle avoidance information. Navigation system 500 is similar to navigation system 400 and generally includes a radar antenna 506 on left wing 102, a radar antenna 508 on right wing 104, processing electronics 510, a display 512, and a user interface 514. Radar antennas 506 and 508, display 512, and user interface 514 are similar in configuration to radar antennas 406 and 408, display 412, and user interface 414. Navigation system 500 also includes a display driver 516, an aircraft configuration module 518, a global positioning device 520, and a memory device 522.

Processing electronics 510 are configured to interpret radar returns received at radar antennas 506 and 508. Processing electronics 510 may determine a velocity of first and second wings 102 and 104 based on radar returns received at radar antennas 506 and 508. Based on the determined velocity of wings 102 and 104, processing electronics 510 can calculate the heading, velocity, and/or position of the aircraft. Processing electronics 510 can also be configured to use the radar return data to determine navigation solutions to stay centered in runways and taxiways in order to avoid fixed obstacles such as signage, lighting, etc. and/or to avoid traffic (e.g., aircraft and ground vehicles). According to various exemplary embodiments, processing electronics 510 can be any hardware and/or software processor or processing architecture capable of executing instructions and processing radar returns.

Aircraft configuration module 518 is configured to store and/or provide various information related to a state or configuration of aircraft 100. For example, aircraft configuration module 518 may store information related to a center of gravity of aircraft 100, a landing gear position of aircraft 100, a position of radar antennas 506 and 508, and/or a position of a GPS antenna (e.g., for global positioning device 520). According to various exemplary embodiments, aircraft configuration module may be any hardware and/or software architecture capable of storing and/or providing aircraft configuration information, for example a database.

Global positioning device 520 can be any device configured to communicate with satellites in a global positioning system to determine a velocity, heading, and/or position of aircraft 100. Memory 522 is configured to store instructions for execution by processing electronics 510 and/or to store data for use by processing electronics 510 such as a history of calculated velocities, headings, and/or positions of the aircraft. Memory 522 may be a volatile or non-volatile memory.

Processing electronics 510 are further configured to use information received from aircraft configuration module 518, global positioning device 520, and memory device 522 to determine the velocity of wings 102 and 104 and determine the presence of obstacles. Processing electronics 510 may "blend" the inputs from radar antenna 506, radar antenna 508, and global positioning device 520, for example, processing electronics 510 may determine a generally high-precision solution for the velocity, heading, and position of the aircraft based on the inputs from these devices. The determination of the velocity, heading, and/or position of aircraft 100 may be adjusted depending on the information received from aircraft configuration module 518 or additional information can be derived from aircraft configuration module 518. For example, while basic information such as the velocity of the aircraft and turn rate can be derived from velocity of the wing tips, the actual track of the landing gear through a turn can be derived using the relative location of each set of wheels compared to the location of the radar antennas.

Display driver 516 is configured to process data from processing electronics for use by display 512. While user interface 514 can be directly coupled to processing electronics 510 as illustrated, according to other exemplary embodiments, input received from user interface 514 can also be processed by display driver 516 for output to display 516. Display driver 516 can then communicate the received input to various other components. Display driver 516 can be any computer hardware and/or software that enables display 512 to communicate with and receive data from processing electronics 512 or other components.

Figure 6:
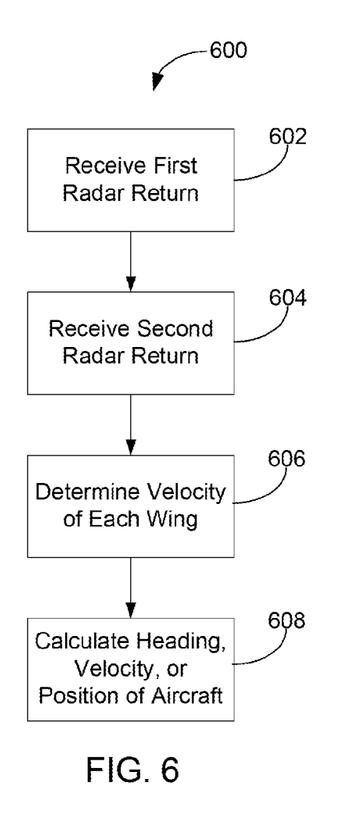
FIG. 6 is a flow chart illustrating a method for calculating velocity and track information of an aircraft according to an exemplary embodiment.

Referring to FIG. 6, a method 600 is configured to determine a heading, velocity, and/or position of aircraft 100 using a navigation system (e.g., navigation system 400 or 500) according to an exemplary embodiment. A radar antenna of wing 102 (e.g., antenna 406 or 506) receives a first radar return (step 602) and a radar antenna of wing 104 (e.g., antenna 408 or 508) receives a second radar return (step 604). Processing electronics (e.g., processing electronics 410 or 510) determine a velocity of each wing based on the radar returns (step 606). The processing electronics then determine or calculate the heading, velocity, and/or position of the aircraft based on the determined wing velocities (step 608).

Figure 7:
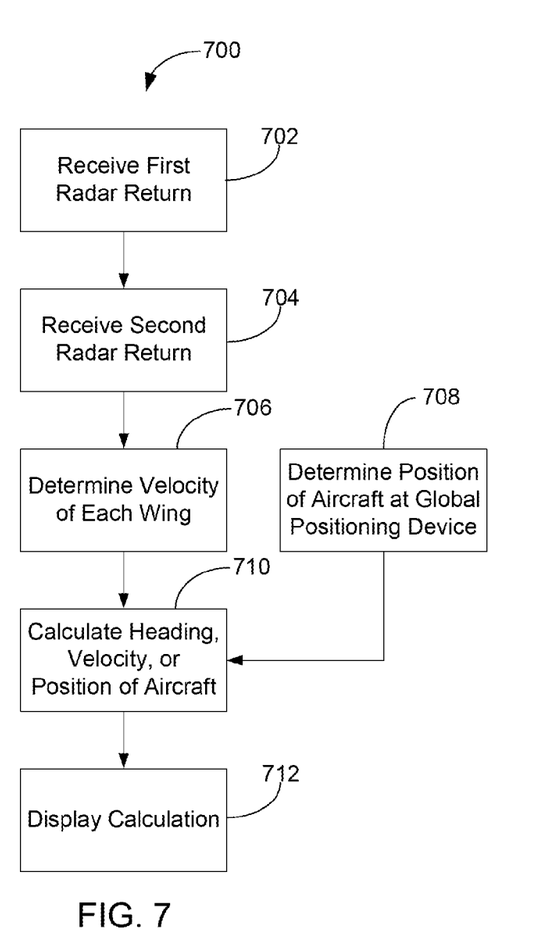
FIG. 7 is a flow chart illustrating a method for calculating velocity and track information of an aircraft according to another exemplary embodiment.

Referring to FIG. 7, a method 700 is configured to determine a heading, velocity, and/or position of aircraft 100 using a navigation system (e.g., navigation system 400 or 500) according to another exemplary embodiment. A radar antenna of wing 102 (e.g., antenna 406 or 506) receives a first radar return (step 702) and a radar antenna of wing 104 (e.g., antenna 408 or 508) receives a second radar return (step 704). Processing electronics (e.g., processing electronics 410 or 510) determine a velocity of each wing based on the radar returns (step 706). Global positioning device 520 (or the processing electronics using global position device 520) determines a position of aircraft 100 (step 708). The processing electronics determine or calculate the heading, velocity, and/or position of the aircraft based on the determined wing velocities from step 706 and the determined position of the aircraft at step 708 (step 710). A display (e.g., display 412 or 512) then shows the calculated heading, velocity, and/or position of aircraft 100.

Figure 8:
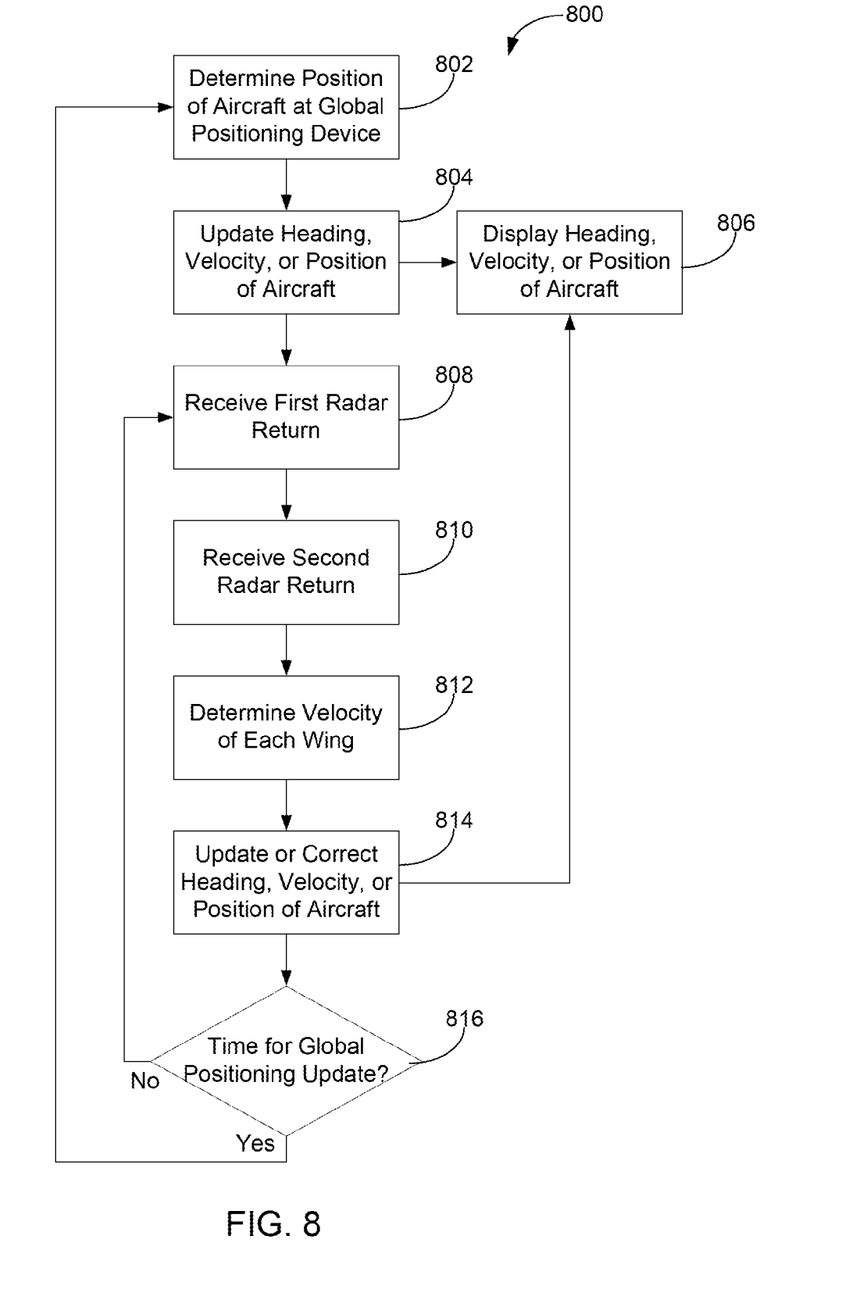
FIG. 8 is a flow chart illustrating a method for calculating velocity and track information of an aircraft according to another exemplary embodiment.

Referring to FIG. 8, a method 800 is configured to determine a heading, velocity, and/or position of aircraft 100 using a navigation system (e.g., navigation system 400 or 500) according to another exemplary embodiment. Global positioning device 520 (or the processing electronics using global position device 520) determines a position of aircraft 100 (step 802). The processing electronics determine or update the heading, velocity, and/or position of the aircraft based on the position of the aircraft determined at step 802 (step 804) and a display (e.g., display 412 or 512) shows an indication of the updated heading, velocity, and/or position of the aircraft (step 806). A radar antenna of wing 102 (e.g., antenna 406 or 506) receives a first radar return (step 808) and a radar antenna of wing 104 (e.g., antenna 408 or 508) receives a second radar return (step 810). The processing electronics determine a velocity of each wing based on the radar returns (step 812) and update, correct, or override the heading, velocity, and/or position of the aircraft based on the determined wing velocities from step 812 (step 814). The display then shows the updated heading, velocity, and/or position of aircraft 100 at step 806. The processing electronics then determine whether it is time for a global positioning update (step 816). If it is not time for a global positioning update, the navigation system continues to update the heading, velocity, and/or position of the aircraft using radar returns to determine the wing velocity. If it is time for a global positioning device update, method 800 returns to step 802 to update the heading, velocity, and/or position using global positioning data. It is noted that alternatively, the processing electronics may poll the global positioning device at fixed intervals or between radar updates without checking to see if global positioning updates are available.

Figure 9:
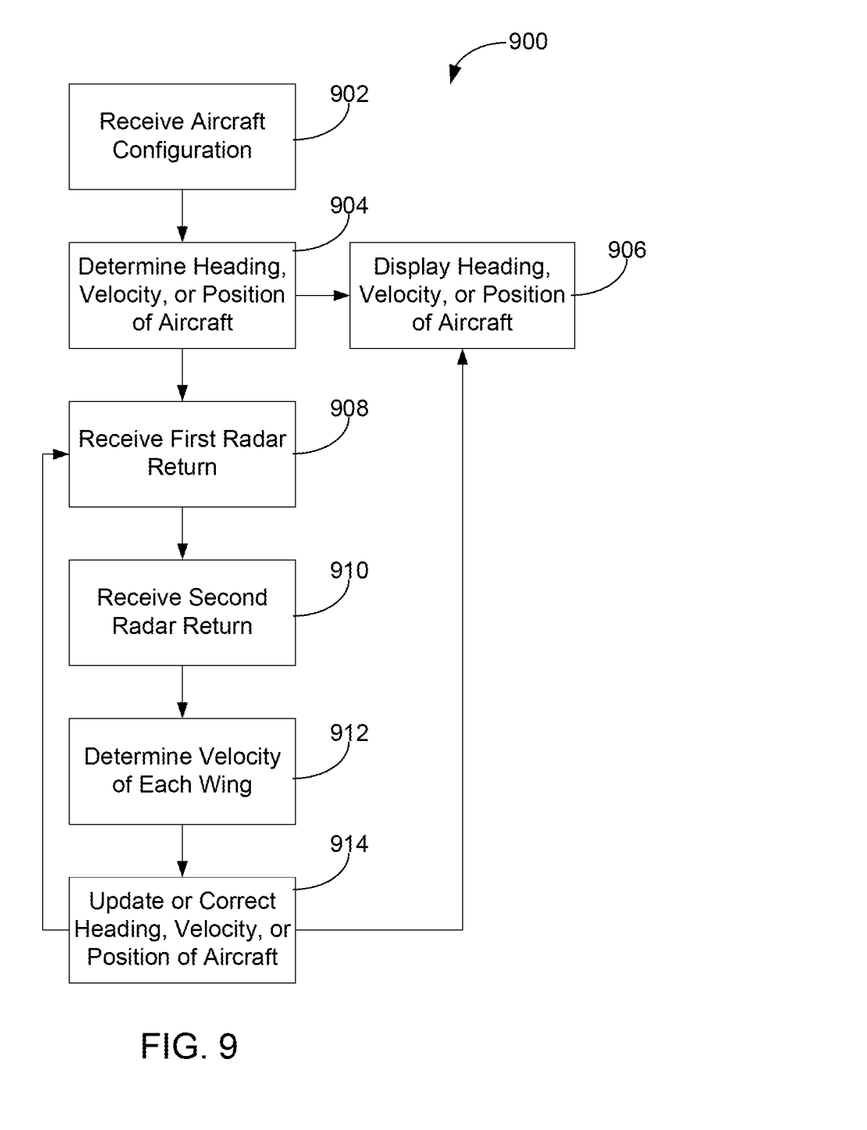
FIG. 9 is a flow chart illustrating a method for calculating velocity and track information of an aircraft according to another exemplary embodiment.

Referring to FIG. 9 a method 900 is configured to determine a heading, velocity, and/or position of aircraft 100 using a navigation system (e.g., navigation system 400 or 500) according to another exemplary embodiment. Processing electronics (e.g., processing electronics 410 or 510) receives an aircraft configuration (step 902), for example a center of gravity of aircraft 100, a landing gear position of aircraft 100, a position of radar antennas 506 and 508, and/or a position of a GPS antenna. The processing electronics determine or update the heading, velocity, and/or position of the aircraft based on the configuration information from step 902 and previous radar returns or global positioning updates (step 904). A display (e.g., display 412 or 512) shows an indication of the updated heading, velocity, and/or position of the aircraft (step 906). A radar antenna of wing 102 (e.g., antenna 406 or 506) receives a first radar return (step 908) and a radar antenna of wing 104 (e.g., antenna 408 or 508) receives a second radar return (step 910). The processing electronics determine a velocity of each wing based on the radar returns (step 912) and update, override, or correct the heading, velocity, and/or position of the aircraft based on the determined wing velocities from step 912 (step 914). The display then shows the updated heading, velocity, and/or position of aircraft 100 at step 806.

Furthermore, it should be appreciated that the specific sequences of processes shown in the embodiments of FIGS. 6-9 are by way of example only. For example, the methods may determine the heading, velocity, and/or position of the aircraft using radar returns, global positioning information, and aircraft configuration information. Furthermore, there may be no check for a global positioning update (step 816) but the system may simply poll the current data at fixed time periods. According to other exemplary embodiments, additional steps may be included or various steps can be omitted from the illustrated methods.

Figure 10:
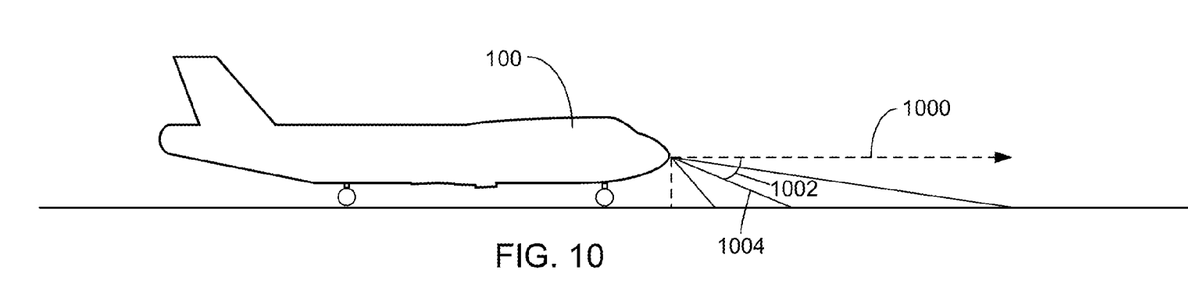
FIG. 10 is a side view of an aircraft and various radar returns and angles that can be used to determine velocity according to an exemplary embodiment.

Referring to FIG. 10, a side view of aircraft 100 illustrates various radar returns and geometries that may be used to determine a velocity vector 1000 of wing 102 or wing 104. The wing speed is determined by Doppler shift in ground echoes or returns. Each individual ground patch echo has a Doppler value that is a function of the range and geometry of observation, the angle of elevation & azimuth with reference to the wing speed vector. For example, an angle 1002 between a radar pulse 1004 and wing velocity vector 1000. The Doppler value or frequency is generally equal to twice the measured velocity divided by the wavelength of the radar return at the frequency of operation. A ground patch echo from a given Range R, will have a velocity V given by $V=V_{wing} \times \cos(\text{elevation})$, where the elevation=arcsine (H/R) and H is the height of the radar.

Figure 11:
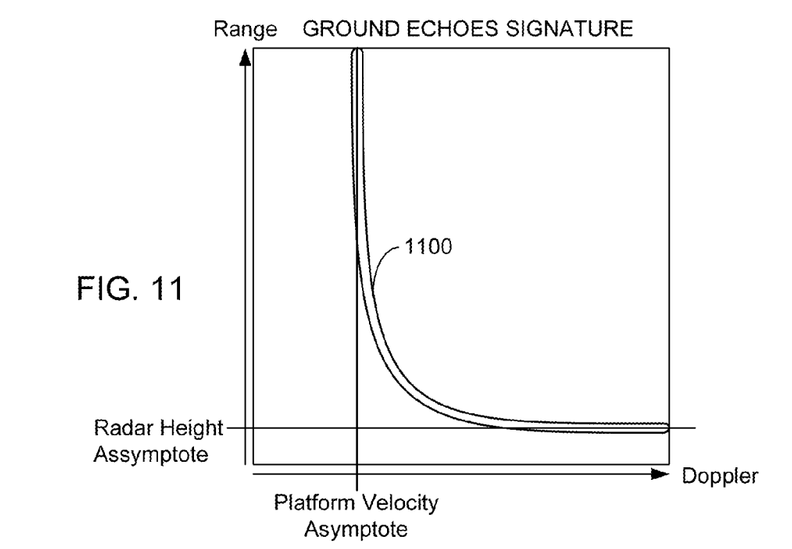
FIG. 11 is a graph illustrating a signature of ground echoes of radar returns according to an exemplary embodiment.

Referring also to FIG. 11, navigation system 400 or 500 collects echoes from the radar antennas and classifies the echoes into a Range×Doppler Matrix (RDM) 1100. The number of echoes are summed by column. In a first pre-selection, the navigation system determines the N×Doppler values that totalize the greater number of echoes. Processing electronics 410 or 510 then performs a best fit algorithm between the measured RDM and the ground echoes theoretical signature to determine wing velocity 1000.

To estimate the wing velocity processing electronics 410 or 510 may execute a Recursive Least Square algorithm that estimates the wing velocity using the data measurements and adaptative time varying filtering to estimate the parameters at a specific time "n." The parameters at time "n" are determined based on an estimation of time "n−1" and measured data at time "n". Alternatively, a Bayesian estimation algorithm can be used to estimate the wing velocity.

The heading of aircraft 100 may be determined by comparing the wing velocities. If the wing velocities are the same, the aircraft is moving in a straight line or stationary. If the wing velocities are different, the aircraft is turning. The wing with the higher velocity is the outside wing of the turn (e.g., if left wing 102 is faster, the aircraft is turning right and vice versa). The position of the aircraft can be determined from a history of velocity and heading determinations from an initial starting position.

While the detailed drawings, specific examples, detailed algorithms, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. For example, the scope of the claims are intended to cover any technique that uses a selectable fractional aperture unless literally delineated from the claims. Furthermore, other substitutions, modifications, changes, and omissions may be made in the design, operating conditions, and arrangement of the exemplary embodiments without departing from the scope of the invention as expressed in the appended claims.

What is claimed is:

1. A navigation system for use on an aircraft for determining a heading, velocity, and/or position of the aircraft, comprising:
   a first radar antenna for mounting to a first wing of the aircraft and configured to receive radar returns;
   a second radar antenna for mounting to a second wing of the aircraft and configured to receive radar returns, the first wing and second wing extending from opposite sides of the aircraft; and
   processing electronics configured to determine a velocity of the first and second wings based on the radar returns, the processing electronics calculating the heading, velocity, and/or position of the aircraft based on the determined wing velocities.

2. The navigation system of claim 1, wherein the radar antennas are configured to be located at or near tips of the first and second wings.

3. The navigation system of claim 1, further comprising:
   a global positioning device for mounting to the aircraft and configured to determine the position of the aircraft,
   wherein the processing electronics determine the heading, velocity, and/or position of the aircraft based on the wing velocities and the position of the aircraft determined by the global positioning device.

4. The navigation system of claim 3, wherein the processing electronics update the heading, velocity, and/or position of the aircraft using the wing velocities at time periods between updates of the heading, velocity, and/or position based on the position of the aircraft determined by the global positioning device.

5. The navigation system of claim 3, wherein the processing electronics use the heading, velocity, and/or position of the aircraft determined from the wing velocities to override or correct the heading, velocity, and/or position of the aircraft determined from the position of the aircraft determined by the global positioning device.

6. The navigation system of claim 1, wherein the processing electronics use aircraft configuration information to determine the heading, velocity, and/or position of the aircraft.

7. The navigation system of claim 6, wherein the aircraft configuration information comprises at least one of a location of an aircraft center of gravity, a landing gear position, a position of one or both the radar antennas, and a global positioning system position.

8. The navigation system of claim 1, wherein the first and second radar antennas are also used to locate potential obstructions relative to the position of the aircraft.

9. The navigation system of claim 1, wherein the processing electronics calculate the heading of the aircraft based on a difference between the wing velocities, the processing electronics calculate the velocity of the aircraft based on a history of differences between the wing velocities, and the processing electronics calculate the position of the aircraft based on a predetermined starting point of the aircraft and a history of calculated velocities of the aircraft.

10. The navigation system of claim 1, wherein the wing velocities are velocities relative to the ground, velocities relative to each other, velocities relative to weather, velocities relative to terrain, or velocities relative to an obstacle.

11. The navigation system of claim 1, wherein the determined heading, velocity, and/or position of the aircraft is stored in a memory device and/or displayed on an electronic display.

12. The navigation system of claim 1, wherein the aircraft is taxiing or on a runway and the wing velocities are determined relative to the ground.

13. A method for determining a heading, velocity, and/or position of an aircraft, comprising:
   receiving a first radar return at a radar antenna for mounting to a first wing of the aircraft;
   receiving a second radar return at a radar antenna mounted to a second wing of the aircraft, the first wing and the second wing extending from opposite sides of the aircraft;
   determining a velocity of each wing based on the radar returns using processing electronics; and
   calculating the heading, velocity, and/or position of the aircraft based on the determined wing velocities using the processing electronics.

14. The method of claim 13, wherein the radar antennas for mounting to the first and second wings are configured to be located at or near tips of the first and second wings.

15. The method of claim 13, further comprising:
   determining a position of the aircraft at a global positioning device for mounting on the aircraft,
   wherein the processing electronics determine the heading, velocity, and/or position of the aircraft based on the wing velocities and based on the position of the aircraft determined by the global positioning device.

16. The method of claim 15, further comprising:
   updating the heading, velocity, and/or position of the aircraft using the wing velocities at time periods between updates of the heading, velocity, and/or position based on the position of the aircraft determined by the global positioning device.

17. The method of claim 13, further comprising:
   receiving an aircraft configuration at the processing electronics, the processing electronics using the aircraft configuration to determine the heading, velocity, and/or position of the aircraft,
   wherein the aircraft configuration comprises at least one of a location of an aircraft center of gravity, a landing gear position, a position of one or both the radar antennas, and a global positioning system position.

18. The method of claim 17, wherein the processing electronics calculate the heading of the aircraft based on a difference between the wing velocities, the processing electronics calculate the velocity of the aircraft based on a history of differences between the wing velocities, and the processing electronics calculate the position of the aircraft based on a predetermined starting point of the aircraft and a history of calculated velocities of the aircraft.

19. The method of claim 13, wherein the wing velocities are velocities relative to the ground, to each other, to signage, to lighting structures, or to buildings.

20. An apparatus for determining a heading, velocity, and/or position of an aircraft, comprising:
  means for receiving a first radar return at a first wing of the aircraft;
  means for receiving a second radar return at a second wing of the aircraft, the first wing and the second wing extending from opposite sides of the aircraft;
  means for determining a velocity of each wing based on the radar returns; and
  means for calculating the heading, velocity, and/or position of the aircraft based on the determined wing velocities.

* * * * *